March 7, 1933.  H. A. KING  1,900,448
AUTOMOBILE ACCESSORY
Filed Sept. 1, 1928
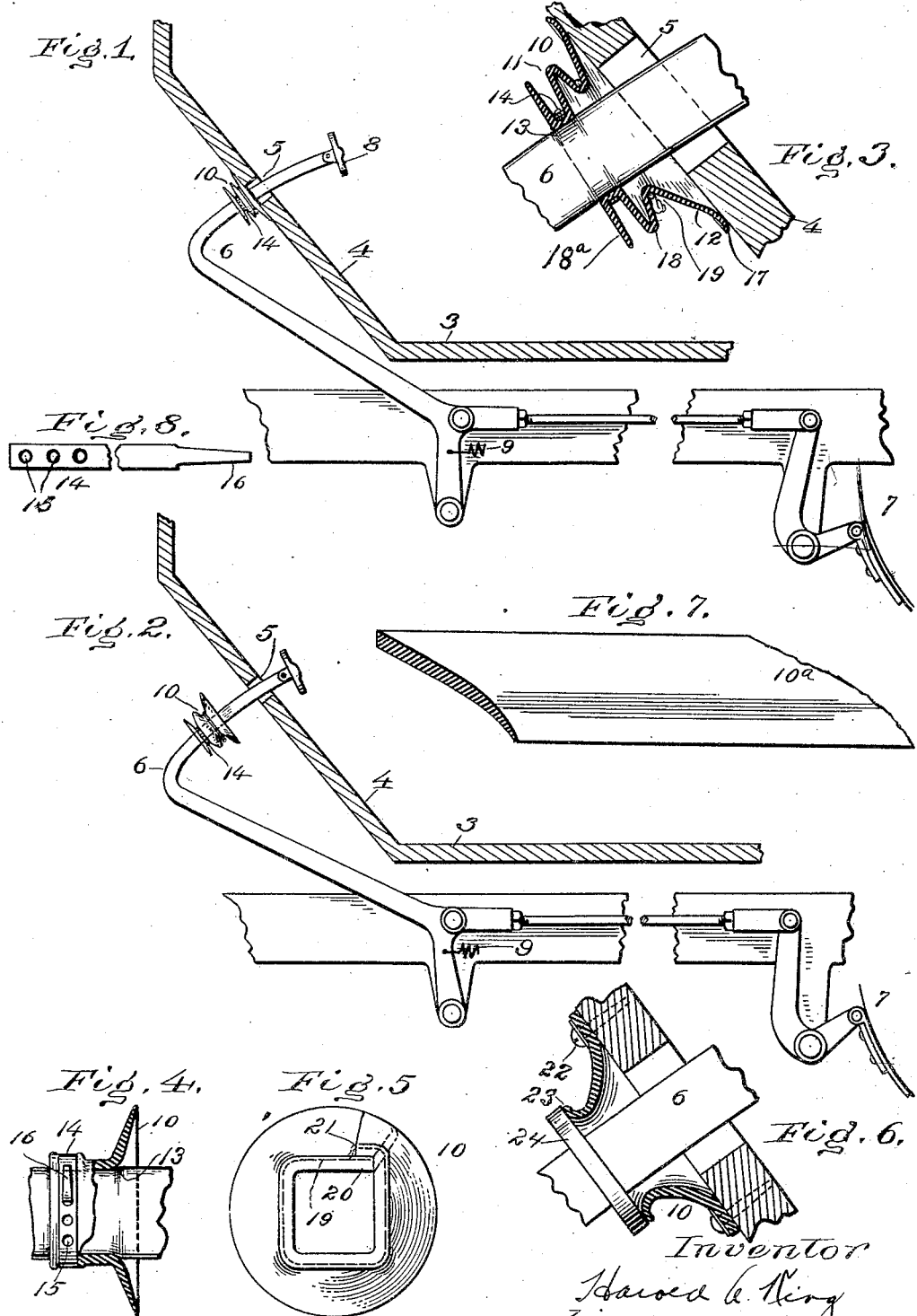

Patented Mar. 7, 1933

1,900,448

UNITED STATES PATENT OFFICE

HAROLD A. KING, OF BIRMINGHAM, MICHIGAN

AUTOMOBILE ACCESSORY

Application filed September 1, 1928. Serial No. 303,390.

In a modern automobile, the brake and clutch mechanisms are operated by foot pedals or levers which extend through suitable openings in the footboard of the automobile, springs associated with said mechanisms returning the levers to normal position of rest when released. A common and serious defect inherent in constructions of this character is that air and vapors from beneath the footboard and from about the motor of the car pass upwardly through these lever openings into the body of the car to the discomfort and possible harm of the occupants thereof, the air in warm weather being unduly heated and in cold weather forming drafts, while any noxious vapors will be free to pass through the lever openings at any time. Various expedients have been resorted to for overcoming the foregoing defect, but all are lacking in some important respect, in that either they interfere with the proper movement of the levers or do not properly cover the lever openings, or are of such nature as to require exact adjustment with relation to the spring associated with the levers, or are otherwise defective.

With these defects of the art in view, therefore, the present invention contemplates a cover device for a lever opening of the footboard of an automobile which will effectually cover the opening when the lever is in normal position of rest, this cover being so formed and arranged that it will not under any circumstances or in any degree interfere with the movement of the lever. It is also within the purview of the invention that such cover shall be of such nature, and so located with relation to the footboard and the lever, that it will require no fine adjustment with relation to the spring actuating the lever, and furthermore that it shall be simple and inexpensive in construction, and easily installed and removed. These and other objects of the invention will be set forth in the following description.

A cover for a lever opening in an automobile footboard constructed in accordance with the principles of the present invention is associated with the footboard and lever and is attached to one of said parts and arranged to contact at its free edge with the other of said parts, whereby an air-tight engagement of the cover with the footboard and lever is provided when the lever is in its normal position of rest. As the lever is brought to such position of rest under the compulsion of the spring associated therewith, the cover in a preferred form is made self-adjustable and to that end of a resilient material, as rubber, and its parts so located with relation to the spring that sufficient pressure is brought to bear upon it by the spring to compress the material of the cover, when the free edge of the latter is brought into contact with the other of said parts, and by the inherent tension of the cover assure that said contact shall be air-tight. Other features of the invention will be hereinafter described.

Referring to the accompanying drawing:

Fig. 1 is a fragmentary sectional elevation of the floor and footboard of an automobile and the lever and brake mechanism, having an embodiment of my invention applied thereto, the lever being shown in its normal position of rest with the cover functioning;

Fig. 2 is a generally similar view, showing however the lever in depressed or braking position with the cover in inoperative position;

Fig. 3 is an enlarged view of the cover and surrounding parts shown in Fig. 1 and shows the preferred method of fastening the cover to the lever by reducing a part of the latter;

Fig. 4 is a sectional view of a modified form of the cover;

Fig. 5 is a rear face view of same;

Fig. 6 is a sectional view of another modification of the invention;

Fig. 7 is a plan view of a strip of material from which the cover illustrated in Fig. 4 can be made; and Fig. 8 is a broken view of a member for fastening one form of the cover to the lever.

Referring to the drawing in detail, there is illustrated therein a part 3 of the floor of an automobile from which slants upwardly a footboard 4 which is formed with a lever opening 5 therethrough. A curved lever 6, which at its lower end is connected to a mechanism associated with the car, as for example a brake 7, extends through and moves in the opening 5 and a foot pad or pedal 8 is mounted upon its upper end. Associated with the brake mechanism is a spring 9, which acts to return the lever to its normal position of rest after it has performed, through the force applied to the pedal 8, its function in connection with the brake mechanism. These parts are conventional in construction and operation.

With the construction as thus far described, it will be seen that the vapors and heated or cold air below the footboard are permitted to pass through the lever opening 5 with the resultant evils hereinbefore described. Means are therefore provided in accordance with the present invention to cover the lever opening and prevent the passage of such vapors or air from below the footboard.

It is highly desirable that a device of this character should combine simplicity and economy of construction with facility of operation, and the embodiment of the invention illustrated in Figs. 1, 2 and 3, therefore, consists of a bell-shaped cover 10, comprising a body portion 11 adapted to surround the lever 6 and which flares at one end into a mouth 12, which, as will be seen, is peculiarly adapted to cover the opening 5, the dimensions of the flare being suited to those of the opening. The body portion of the cover constitutes a base for the flaring mouth, and, as will be explained, is availed of in the present embodiment of the invention in anchoring the cover securely in place.

While this bell-like cover 10 may be located either above or below the footboard, it is preferably placed below, inasmuch as, when in position above the footboard, it might interfere with the proper operation of other parts by the driver. As the cover surrounds the lever and must cover the opening in the footboard, it is preferred to attach the cover to one of these parts, and in this embodiment of the invention, for reasons which will presently appear, it is attached to the lever. It is necessary that the cover be affixed to the lever with a grip so firm that the cover will not be displaced by its contact with the footboard when in service. This may be done in various ways, but, preferably and as shown, the lever 6 is formed with a reduced portion 13, about which is closely arranged the lower portion of the cover, see Fig. 3. This reduced portion of the lever is preferably made of a different cross-sectional contour from that of the rest of the lever so as to provide additional resistance by the lever to any movement by the cover. In this instance, the reduced portion is made rectangular in cross-section, see Fig. 4, the remainder of the lever being conventionally oval in cross-section, or generally cylindrical in shape. The lower portion of the cover is made similar in contour to the reduced portion 13 of the lever, thus cooperating with such portion in offering resistance to movement by the cover on the lever. The cover is fastened in place by a soft metal band 14, see Fig. 8, which is formed at one end with a number of holes 15, through one of which the reduced opposite end 16 of the band may be extended and folded back. Any other suitable fastening device may be used, as desired. By mutually adjusting the cover and band so that a portion of the cover will form a lip expanding about the lever below the band, this lip will serve to keep the band in place by preventing it from slipping in the direction of the lip. And in a modification of the invention soon to be described and in which the cover is bisected, the band will assist in keeping the abutting edges of the cover from separating under compression.

It will be noted that, since the cover is attached to the lever, it must travel with the latter in its movements to and fro, as it is alternately pushed by the operator to an active or braking position, as shown in Fig. 2, or as, under the compulsion of the spring, it is returned to its normal position of rest, as shown in Figs. 1 and 3. Again seeking simplicity of construction, it is desirable that in this embodiment of the invention the cover should be, and it is, arranged or anchored solely on the lever, thus avoiding the complications resulting from mounting the cover on both the footboard and the lever. When thus mounted solely on the lever, the cover is free to travel with the lever without hindering the latter in its movements. In order to insure proper contact of its flaring mouth with the footboard, however, when the lever is in its normal position of rest, the cover is secured or anchored to the lever at a point somewhat less distant from the footboard, when the lever is in said position of rest, than the normal length of the cover, so that the latter will be somewhat compressed, as indicated at 17, Fig. 3. In order to promote this compression of the cover and to make it self-adjusting, the cover in the present instance is made of resilient material, such as rubber, so that when the cover is pressed against the footboard, under the compulsion of the spring, the flaring mouth will spread and be placed under its inherent tension, and an additional portion of it will come into close contact with the footboard and thus an airtight contact be provided between the cover and the footboard. When the lever is moved or depressed to perform its function, the cover will resume its normal shape. In this way, any wear or looseness of the parts which might cause the lever to drop or sag is fully compensated for and the air-tight contact of the lever with the footboard maintained at all times.

In order to facilitate the compression of the cover, it is in this embodiment made in accordion or bellows form having an intermediate fold 18, which, as shown, is somewhat less in diameter than the mouth of the cover, thus preserving the bell-like shape of the cover. To form the fold 18, see Fig. 3, the part of the cover above the fold is contracted to the desired reduced dimension and a wire 19 is arranged about said reduced portion or flute. Further allusion will be made to this feature. It is to be noted that in this bellows construction a rubber material is not absolutely essential, as the cover can be made of a material which can be flexed or folded and yet possess sufficient stiffness to impart a tendency to the cover to resume its original shape after the compression by the spring has ceased. It is preferred however, to make the cover of rubber, especially the mouth portion where it contacts with the footboard.

The cover, when constructed as above described, can be stretched and slipped over the foot pad or pedal of the lever into its place about the reduced portion of the lever. It is not intended however to limit the invention to such method of attachment, as situations may arise in which it would be desirable to attach the cover in some other way. The invention therefore has in view such other ways, and to this end the cover may be split along one side parallel to its longitudinal axis, as in the embodiment shown in Figs. 4 and 5, or at an angle to said axis, and in this condition the body portion can be wrapped around the reduced portion of the lever and secured thereto in any desired manner, as with the band 14. The abutting lateral edges 20, 21 will be held together by the wire 19 which prevents the unequal bulging of said sides and the consequent passage of air therebetween.

When the bellows-like cover of Figs. 1 to 3 is split along one side, it may be desirable to locate it on the lever 6 so that it will be fully compressed by contact with the footboard 4 in order to cause the fold 18 to press against the lower lip 18ª of the cover or against the flared mouth 12 as well and in this way seal the space between the split edges of the cover in case they should spread unduly in the compression of the cover. In such case, the degree of expansion of the cover upon the depression of the foot lever 6 could be made great enough to maintain contact with the footboard 4 at all times and this without in any wise interfering with the free movement of the lever.

It may be here noted that a simple, convenient and inexpensive way to make the covers for the split embodiments is to mold a continuous strip 10ª of rubber, as shown in Fig. 7, of proper shape and relative dimensions, which strip can be cut transversely into sections. These sections will each be of proper size to be wrapped around the lever 6 with their abutting edges folded over, as described. The strip may be made with an even surface as shown for the embodiment of Figs. 4 and 5 or in a fluted condition for the embodiment of Figs. 1 to 3. Or, the individual covers may be separately molded in their final form if desired, or made in any other desired manner.

While the cover has been shown and described in a preferred embodiment as bellows-like in form, the bellows feature may, if desired, be omitted and the cover made in the bell-like form shown in Figs. 4 and 5, this form in other respects being like the form shown in Figs. 1 and 2 and operating in like manner thereto.

As has been stated above, the invention broadly contemplates associating the cover with the footboard and lever and attaching the cover to one of said parts, while arranging it so that its free edge will contact with the other of said parts. The embodiment of the invention, heretofore described, is attached to the lever and arranged to have its free edge or flaring mouth contact with the footboard. In the embodiment of the invention illustrated in Fig. 6, the base of the cover is attached, as by screws 22, to the footboard, and the opposite free end 23 faced downwardly and spaced from the lever to insure non-interference of the cover with the lever at all times. Arranged on the lever is an annular flange 24, which may be attached to or form an integral part of said lever, and which contacts with the free edge 23 of the cover, when the lever is brought to position of rest, the flange being so located with relation to the cover that when so contacting, it will exert sufficient pressure under compulsion of the spring to compress the cover, the free edge 23 being for this purpose preferably slightly inclined outwardly. The cover therefore in this embodiment is likewise made of rubber in order to make it self-adjusting for reasons similar to those given in connection with the embodiment of the invention first herein described. While the bellows feature has not been shown in this embodiment of the invention, it may be incorporated, if desired.

It will be seen that a cover for lever openings constructed as herein shown and described will carry out the objects of the invention as above enumerated besides possessing other advantages which will be apparent to those skilled in the art.

The invention in its broader aspects is not limited to the precise construction shown and described as many changes may be made in the details thereof without departing from the main principles of the invention or sacrificing its chief advantages.

Having thus described my invention, what I claim is:

1. In or for an automobile, the combination of a footboard having a lever opening therethrough, a lever extending through said opening, a cover fixed to said footboard about said opening, and a member arranged on said lever to contact with the free edge of said cover, whereby a substantially air-tight seal is established between said cover and the footboard and lever.

2. In or for an automobile, the combination of a footboard having a lever opening therethrough, a lever extending through said opening, a self-adjusting cover fixed to said footboard about said opening, and a member arranged on said lever to contact with the free edge of said cover.

3. In or for an automobile, the combination of a footboard having a lever opening therethrough, a lever extending through said opening, a resilient hollow rubber cover fixed to said footboard about said opening, and a member arranged on said lever to contact with the free edge of said cover.

4. In or for an automobile, the combination of a footboard member formed with a lever member opening therethrough, a lever member extending through said opening, and a resilient cup-shaped cover for said opening arranged between said footboard member and lever member so as to have one end free and having its opposite ends arranged to contact with said members respectively in such manner that said cup-shaped cover will be compressed when the pedal is in normal position of rest and a substantially airtight seal be established between the cover and the footboard and lever.

5. In or for an automobile, the combination of a footboard member formed with a lever member opening therethrough, a lever member extending through said opening, a spring for moving said lever member to normal position of rest, and a cup-shaped cover for said opening attached to one of said members and arranged to contact with the other member when the pedal is in normal position of rest, said cover being formed of a length of resilient material arranged in cup-shaped form around the pedal and with contacting edges overlapping, and a wire extending about said cover to prevent spreading of said edges under compulsion of the spring when the lever member is in said normal position of rest.

6. In or for an automobile, the combination of a footboard member formed with a lever opening therethrough, a lever member extending through said opening, a spring for moving said lever member to normal position of rest, and a cup-shaped cover for said opening attached to one of said members and arranged to contact with the other member when the pedal is in normal position of rest, said cover being formed of a length of resilient material arranged in cup-shaped form around the pedal and with contacting edges overlapping, a flexible band formed with apertures and arranged about said cover to prevent spreading of said edges under compulsion of the spring when the lever member is in said normal position of rest, said band having an end adapted to be drawn through any of said apertures and folded back into locking position.

7. In or for an automobile, the combination of a footboard having a lever opening therethrough, a lever extending through said opening, a cover for said opening fixed at one edge on the underside of said footboard, and a member arranged on said lever to contact with the free edge of said cover, whereby a substantially air-tight seal is established between said cover and the footboard and lever.

8. In or for an automobile, the combination of a footboard having a lever opening therethrough, a lever extending through said opening, a self-adjusting cover for said opening fixed at one edge on the underside of said footboard, and a member arranged on said lever to contact with the free edge of said cover.

9. In or for an automobile, the combination of a footboard having a lever opening therethrough, a lever extending through said opening, a resilient hollow rubber cover fixed at one edge on the underside of said opening, and a member arranged on said lever to contact with the free edge of said cover.

10. In or for an automobile, the combination with a footboard having a lever opening therethrough, of a lever extending through said opening, and a collapsible cup-shaped cover for said opening arranged between the footboard and lever, said cup-shaped cover having one end free and the other end firmly secured to the lever.

11. In or for an automobile, the combination with a footboard having a lever opening therethrough, of a lever extending through said opening, and a collapsible cup-shaped cover for said opening arranged between the footboard and lever, said cup-shaped cover having one end free and the other end firmly secured to the lever at such a distance from the footboard that the free end of the cup-shaped cover will contact with the footboard and the cover be compressed when the pedal is in normal position of rest and a substantially air-tight seal be established between the cover and the footboard and lever.

12. In or for an automobile, the combination with a footboard having a lever opening therethrough, of a lever extending through said opening, and a collapsible cup-shaped cover for said opening arranged beneath the footboard and between the footboard and lever, said cup-shaped cover having one end free and the other end firmly secured to the lever at such a distance from the footboard that the free end of the cup-shaped cover will contact with the footboard and the cover be compressed when the pedal is in normal position of rest and a substantially air-tight seal be established between the cover and the footboard and lever.

13. In or for an automobile, the combination with a footboard having a lever opening therethrough, of a lever extending through said opening, and a collapsible cup-shaped cover for said opening arranged beneath the footboard and between the footboard and lever, said cup-shaped cover having one end free and the other end firmly secured to the lever, said lever having a reduced portion where the cover is so attached thereto, at such a distance from the footboard that the free end of the cup-shaped cover will contact with the footboard and the cover be compressed when the pedal is in normal position of rest and a substantially air-tight seal be established between the cover and the footboard and lever.

14. In or for an automobile, the combination with a footboard having a lever opening therethrough, of a lever extending through said opening, and a collapsible cup-shaped cover for said opening arranged beneath the footboard and between the footboard and lever, said cup-shaped cover having one end free and the other end firmly secured to the lever, said lever having a reduced portion where the cover is so attached thereto, at such a distance from the footboard that the free end of the cup-shaped cover will contact with the footboard and the cover be compressed when the pedal is in normal position of rest and a substantially air-tight seal be established between the cover and the footboard and lever, and fastening means arranged around said cup-shaped cover at the reduced portion of the lever to hold the cover in position on the lever.

In testimony whereof, I have affixed my signature hereto.

HAROLD A. KING.